Don A. Culwell
INVENTOR.

BY Charles E. Lightfoot
ATTORNEY

United States Patent Office 3,524,629
Patented Aug. 18, 1970

3,524,629
APPARATUS FOR AND METHOD OF
AERATING LIQUIDS
Don A. Culwell, 7811 Hiawatha, Houston, Tex. 77036
Filed July 29, 1968, Ser. No. 748,383
Int. Cl. B01f 5/12
U.S. Cl. 259—95                                    7 Claims

ABSTRACT OF THE DISCLOSURE

A liquid aerating method and apparatus of the floating type constructed to draw liquid from beneath the surface of a body of liquid and discharge the same in a spray above the surface. The method includes establishing an upflow of liquid in an annular flowway, from beneath the surface of a body of liquid directing the liquid upwardly and outwardly radially from the flowway above the surface of the liquid and diverting a portion of the outflowing liquid toward a central location relative to the annular flowway for use as a coolant for a power source from which the apparatus is operated.

The apparatus of the invention includes a floating aerating unit, having means forming an annular, upwardly divergent flowway whose lower end forms an inlet beneath the surface of a body of liquid and whose upper end opens outwardly above such surface; power means for causing an upflow and outflow of liquid through the flowway to form a spray-like stream moving upwardly and radially outwardly from the unit, and including motor means located on the unit in a central position relative to the annular flowway, and means positioned to divert a portion of the outflowing stream from the flowway toward said motor means to cool the same.

BACKGROUND OF THE INVENTION

In the aerating of liquids, such as the effluent from sewage treating plants, and in the treatment of industrial wastes, it is customary to provide ponds or basins for the storage of such liquids during their treatment, and to aerate the liquids by spraying the same into the air by the use of floating pumps or spraying equipment.

Aerating apparatus of this kind commonly comprises a buoyant float upon which a draft tube or eduction pipe is carried, whose lower end opens beneath the surface of the liquid and whose upper end opens outwardly above the surface.

Such apparatus also includes an inverted diffuser cone supported in a downwardly extending position, centrally of the upper end portion of the tube to form therewith an annular, upwardly and radially outwardly extending flowway for directing the upflowing liquid into an upwardly and radially outwardly expanding spray-like stream above the surface of the body of liquid whereby the liquid is oxidized and aerated. The liquid is propelled upwardly through the passageway by suitable means, usually in the form of a propeller mounted on a central shaft and positioned to draw liquid into the lower end of the eduction tube and force it upwardly through the flowway, and an electric motor centrally mounted above the float by which the propeller is driven.

The motor in equipment of this kind is usually enclosed to prevent the entrance of liquid and has an external, surrounding passageway through which an air current is circulated to cool the motor. The motor is customarily provided with built-in fan means for propelling air through the passageway to cool the motor.

Due to the high moisture content of the air over liquid aerating reservoirs of this kind and the flowing about of spray by the wind, damage is often caused by the entrance of moisture into or the condensation of liquid in the interior of the motor, necessitating the use of drain plugs or the like for the removal of condensation. Moreover, a substantial part of the power expended is used in pumping air to cool the motor, so that motors for this kind of apparatus are customarily operated at only 80 percent or less of their power rating in order to prevent over loading.

Various proposals have been made for eliminating the above mentioned difficulties, such as by positioning the motor at a higher elevation above the float and making use of a propeller shaft of increased length to locate the motor out of the spray area. Such an expedient, however, makes it necessary to employ additional bearings for the shaft which are subject to rapid wear and deterioration, and does not assure the maintenance of the motor in a moisture free condition. The positioning of the motor at a substantial height above the float also results in a top heavy effect which increases the instability of the unit and makes it more cumbersome.

The present invention has for an important object the provision of apparatus for the aeration of liquids whereby the above mentioned difficulties may be eliminated and wherein the motor may be operated for long periods of time at its full power rating without overheating.

Another object of the invention is the provision in aerating apparatus of the type referred to of means for cooling the motor which makes use of a portion of the stream of liquid which is being sprayed into the air to aerate the same.

A further object of the invention is to provide a method of aerating liquids by the use of apparatus of the kind mentioned including the diverting of a portion of the liquid which is being sprayed into the air against the exterior of the motor to cool the motor.

SUMMARY OF THE INVENTION

Briefly described, the apparatus of the invention comprises a floating aerating unit including a draft tube or eduction pipe supported on a float with its lower end beneath the surface of a body of liquid to be aerated and its upper end located above such surface and an inverted diffuser cone extending downwardly centrally into said pipe to form therewith an annular upwardly and radially outwardly extending flowway through which the liquid flows upwardly and radially outwardly into the air in a spray-like stream.

Propeller means is provided in the eduction tube at a location to draw liquid into the lower end of the tube from beneath the surface and propel the liquid upwardly through the flowway and upwardly and radially outwardly therefrom to form a spray-like stream in the air above the surface. The propeller is driven by a central shaft connected to a motor supported centrally above the float, and diverter means is carried by the unit at a location to divert a portion of the outflowing stream toward the motor to act as a coolant therefor. The propeller shaft has bearing means which is normally positioned above the level of the liquid and is enclosed in a housing which is open to the flowway, and means is provided for preventing the entrance of liquid from the flowway into the housing during the operation of the equipment.

DETAILED DESCRIPTION OF A PARTICULAR EMBODIMENT OF THE INVENTION

Figure 1:
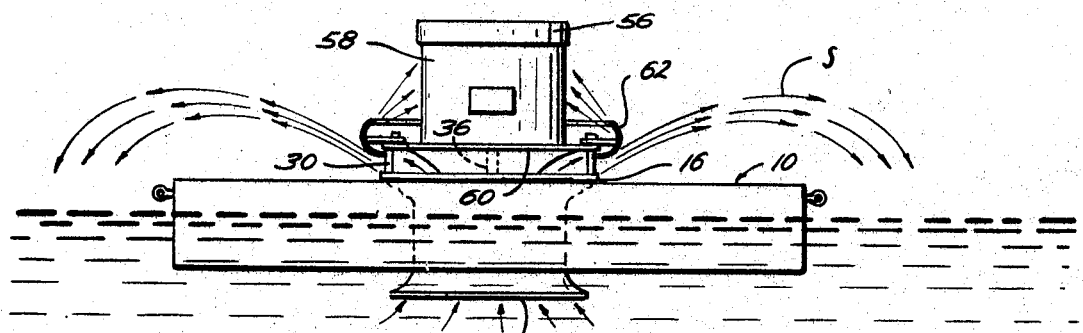
FIG. 1 is a side elevational view illustrating a preferred embodiment of the invention and showing the manner in which the same operates.
Figure 2:
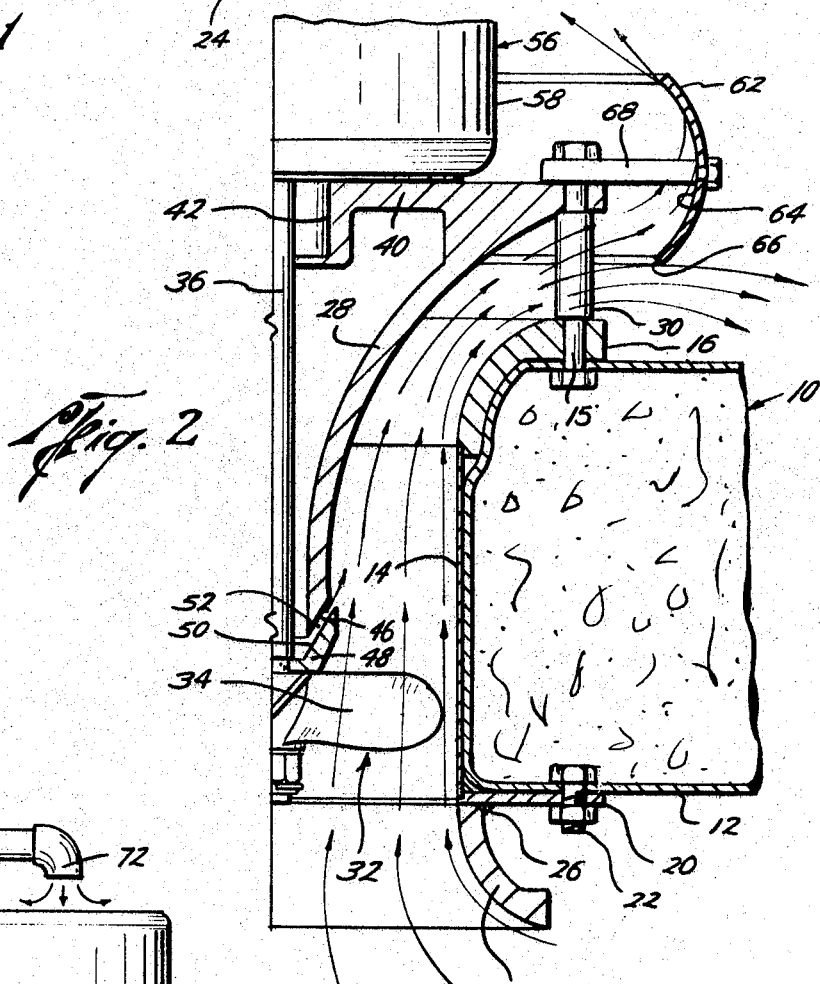
FIG. 2 is a fragmentary vertical, central, cross-sectional view, on a greatly enlarged scale of the invention, as illustrated in FIG. 1.

Referring now to the drawings in greater detail, the invention is disclosed herein in connection with use for the aerating of a liquid held in a reservoir, pond, or the like, in which one or more floating aerator units may be positioned and by which liquid from beneath the surface may be discharge into the air in a spray-like stream.

The apparatus of the invention includes a buoyant body or float, generally designated 10, which may be of any desired material, such as foamed plastic, enclosed in a casing 12, of suitable material to provide strength and rigidity to the body, or without such casing. The float may be of any suitable shape, such as generally doughnut shaped to provide a platform upon which the aerating mechanism may be supported in an upright condition.

The float has a central opening in which a draft tube or eductor pipe 14 is supported, as by means of an upper, annular, flared, flange-like member 16 fitted on the upper end of the tube and which is seated upon the upper face of the surrounding float and attached thereto, as by means of bolts 18, and an annular, bottom plate 20, upon which the tube rests at its lower end and which is secured to the lower face of the surrounding flat, as by means of bolts 22. A downwardly flaring, annular, inlet manner 24 is attached at its upper end to the inner marginal portion of the plate 20, as by welding, or the like, as seen at 26.

An inverted cone shaped diffuser member 28 is attached at the marginal portion of its base to the float by the bolts 15 which extend upwardly through perforations in the member, the diffuser being extended downwardly centrally into the eduction tube.

Suitable means, such as the spacers 30, surrounding the bolts 16, are provided to hold the diffusion cone in spaced relation to the eduction tube to form therewith an annular, upwardly flaring flowway 32, through which liquid may flow upwardly through the inlet member 24, and upwardly and outwardly therefrom through the upper member 16 into the air in a spray-like stream. The upper portion of the flowway is preferably of somewhat less width than the lower portion thereof to form a restriction therein, whereby the velocity of the upward flow of liquid will be increased to cause the liquid to be discharged in a continuous stream into the air to be aerated thereby.

A propeller 34 is mounted on a shaft 36 for rotation therewith to propel the liquid through the passage way 32. The shaft extends centrally through the cone 28, and the propeller is attached to the lower end of the shaft so that the blades of the propeller extend into the flowway to draw liquid from below into the flowway and propel the same therethrough.

The cone 28 may be of hollow construction whose base 40 is formed with a central cavity 42 surround the shaft 36. The shaft 36 extends downwardly through the cone in somewhat inwardly spaced relation thereto leaving an annular opening about the shaft at the lower end of the cone and the lower end of the cone has an externally bevelled face as seen at 46. The shaft 36 carries a generally cup shaped element 48 above the propeller, which has an upwardly flaring inner face 50 positioned in spaced relation to the external bevelled face 46 of the cone to form therewith an annular passageway 52 leading from the interior of the cone into the flowway.

The discharge outlet of the aerator in the present illustration is formed between the outer periphery of the base of the cone 28 and the outer periphery of the upper member 16 and is of ring shape.

The propeller shaft is connected at its upper end to a motor, generally designated 56, which may conveniently be an electric motor of a completely enclosed type having an outer casing 58 which is sealed against the entrance of moisture.

The motor may be suitably mounted centrally on the base of the diffuser cone 28.

For the purpose of diverting a portion of the liquid of the stream discharged into the air from the flowway against the casing 58 of the motor to cool the motor, a diverter element 62, which in the present illustration may be of ring shape having a longitudinally curved inner face 64 is positioned in outwardly spaced relation to the discharge outlet from the flowway in surrounding relation thereto with the lower end 66 of the diverter extending downwardly somewhat beyond the upper extremity of the outlet into the path of the outflowing stream.

The diverter is suitably supported on the base of the diffuser cone, as by means of lugs 68 bolted at their inner ends to the base 40 by the bolts 15 and whose outer ends are connected to the diverter mediate the ends of the same. By this arrangement the lower end of the diverter will be positioned in the stream being discharged from the flowway so that a portion of the stream will enter the diverter to be discharged from the upper end thereof toward the casing 58. It will be apparent that by suitably locating the diverter a portion of the outflowing stream may be diverted to flow against the casing 58 to cool the motor and that the amount of liquid so diverted may be readily varied by suitably shaping and positioning the diverter.

The form of the diverter may be of course, be varied as desired and the diverter may be made as a continuous ring or in a number of separate pieces which may be arranged in the same or different positions relative to the discharge outlet.

In the operation of the equipment, constructed as described above, the aerator unit is floated on the body of liquid to be aerated with the inlet of the eductor tube located below the surface of the liquid. The motor is connected to a source of electrical current in the usual manner, as by means of waterproof electric conductors, and upon operation of the motor the propeller draws liquid from beneath the surface into the flowway and propels the same upwardly and out of the discharge outlet in an upwardly and radially outwardly directed stream. A portion of the outflowing stream is caught by the diverter 62 and directed upwardly and radially inwardly against the motor casing to cool the same.

The upflowing liquid in the flowway will also tend to cause an outflow of any liquid in the interior of the diffuser cone through the passageway 52.

Figure 3:
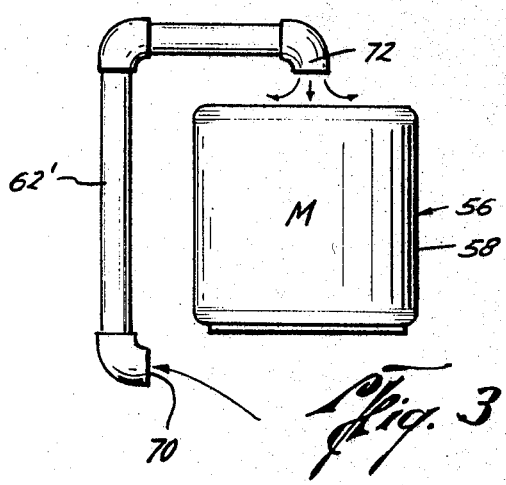
FIG. 3 is a fragmentary side elevational view, on a somewhat enlarged scale, showing a methodified form of the invention.

A somewhat modified form of the diverter means of the invention is illustrated in FIG. 3, wherein one or more diverter pipes, such as the pipe 62', are positioned with their lower inlet ends 70 in the path of flow of the stream being discharged from the aerator and whose upper ends 72 are positioned centrally above the motor casing 58. By this arrangement a portion of the outflowing stream is diverted through the pipes 62 on to the casing 58 to cool the motor.

The method of the invention comprises the discharging of a stream of liquid from beneath the surface of a body of liquid to be aerated upwardly and radially outwardly into the air above such surface and diverting a portion of the stream upwardly and radially inwardly for use as a coolant.

It will thus be seen that the invention provides a method of and apparatus for aerating liquids which is of simple design and rugged construction and by which an electric motor may be used to its full power rating for long periods of time without overheating of the same.

The invention is disclosed herein in connection with a certain specific structure, which is intended by way of illustration only, it being evident that various changes can be made in the construction and arrangement of the parts within the spirit of the invention and the scope of the appended claims.

Having thus clearly shown and described the invention, what is claimed as new and desired to secure by Letters Patent is:

1. Apparatus for aerating a liquid comprising:
   support means adapted to be positioned in a partially submerged condition in the body of liquid and having an opening in communication with the liquid beneath the surface of said body and with the air above such surface,
   means positioned in the opening to form an upwardly extending and radially outwardly flaring flowway through which liquid may flow from beneath said surface into the air above the same,
   means for propelling the liquid through the flowway to cause the liquid to be discharged in a radially outwardly directed stream above the surface and including power means positioned on the support above said surface, and
   means positioned in the path of flow of said stream and shaped for coaction therewith to direct a portion of the liquid of said stream toward said power means.

2. The aerating apparatus as defined in claim 1, wherein said flowway is shaped to cause an increase in the velocity of the liquid flowing therethrough.

3. The aerating apparatus as defined in claim 1, wherein said support means is a buoyant body.

4. The aerating apparatus as defined in claim 3, wherein said opening is located centrally of said buoyant body and said power means is positioned above the opening and said means positioned in the path of flow of said stream is an annular member surrounding said opening and shaped to direct a portion of the liquid of said stream radially inwardly.

5. The aerating apparatus as defined in claim 1, wherein said flowway forming means includes
   a hollow, inverted, cone shaped member centrally positioned in the opening and whose lower end is open, and said power means includes
   a shaft rotatably extended through said member, and
   means carried by the shaft for rotation therewith in external relation to the lower end of said member and shaped to form therewith a passageway in communication with the interior of the member and with said flowway.

6. A method of aerating a liquid which comprises establishing an upward flow of liquid from beneath the surface of a body of liquid to form a stream in an upwardly flaring annular path in the air above the surface and diverting a portion of the stream away from said path in an upwardly converging annular path.

7. The method as defined in claim 6 which includes directing said stream in an upward path away from a central location and diverting a portion of the stream away from said path toward said location.

References Cited
UNITED STATES PATENTS

| | | | |
|---|---|---|---|
| 905,025 | 11/1908 | Trent | 259—96 |
| 2,802,647 | 8/1957 | Bolton | 259—96 X |
| 3,218,042 | 11/1965 | Ciabattari | 259—95 |

ROBERT W. JENKINS, Primary Examiner